(12) United States Patent
Li et al.

(10) Patent No.: US 10,719,909 B2
(45) Date of Patent: Jul. 21, 2020

(54) IMAGE LOADING METHOD AND DEVICE (71) Applicant: ALIBABA GROUP HOLDING LIMITED, Grand Cayman (KY)

(72) Inventors: Jinmin Li, Hangzhou (CN); Xiangui Feng, Hangzhou (CN); Longfei Yu, Hangzhou (CN); Yuanqiu Wang, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

(21) Appl. No.: 16/364,641

(22) Filed: Mar. 26, 2019

(65) Prior Publication Data

US 2019/0220950 A1  Jul. 18, 2019

Related U.S. Application Data (63) Continuation of application No. PCT/CN2017/102867, filed on Sep. 22, 2017.

(30) Foreign Application Priority Data

Sep. 30, 2016 (CN) .......................... 2016 1 0877535

(51) Int. Cl.
*G06T 1/60* (2006.01)
*G06T 9/00* (2006.01)
(Continued)

(52) U.S. Cl.
CPC ............ *G06T 1/60* (2013.01); *G06F 12/0802* (2013.01); *G06F 12/0875* (2013.01); *G06T 9/00* (2013.01);
(Continued)

(58) Field of Classification Search
None
See application file for complete search history.

(56) References Cited

U.S. PATENT DOCUMENTS 5,909,559 A  6/1999 So
7,506,338 B2  3/2009 Alpern et al.
(Continued)

FOREIGN PATENT DOCUMENTS

AU  2012202934 B2  6/2012
CN  101438286 A  5/2009
(Continued)

OTHER PUBLICATIONS

Written Opinion of the International Searching Authority and International Search Report for PCT Application No. PCT/CN2017/102867 dated Dec. 6, 2017 (17 pages).
(Continued)

*Primary Examiner* — Yi Wang
(74) *Attorney, Agent, or Firm* — Sheppard Mullin Richter & Hampton LLP (57) ABSTRACT

This application discloses an image loading method and device. The image loading method may comprise: determining whether a native heap memory stores decoded data of an image to be loaded; in response to determining that the native heap memory stores the decoded data of the image, loading the image based on the decoded data of the image from the native heap memory; and in response to determining that the native heap memory does not store the decoded data of the image, loading the image from a storage space storing the image, and storing, into the native heap memory, decoded data of the image obtained in the process of loading the image.

20 Claims, 3 Drawing Sheets

(51) Int. Cl.
*G06F 12/0875* (2016.01)
*G06F 12/0802* (2016.01)

(52) U.S. Cl.
CPC ............ *G06F 2212/1032* (2013.01); *G06F 2212/455* (2013.01); *G06T 2200/28* (2013.01)

(56) References Cited

U.S. PATENT DOCUMENTS

| | | | |
|---|---|---|---|
| 8,131,130 | B2 | 3/2012 | Ikeda et al. |
| 8,155,501 | B2 | 4/2012 | Oda et al. |
| 8,280,197 | B1 | 10/2012 | Foote et al. |
| 9,501,415 | B1* | 11/2016 | Racine ................ G06F 12/0875 |
| 2003/0095135 | A1* | 5/2003 | Kaasila ................ G06F 3/0481 345/613 |
| 2007/0106761 | A1 | 5/2007 | Beoughter et al. |
| 2008/0089660 | A1 | 4/2008 | Hashimoto et al. |
| 2009/0006506 | A1 | 1/2009 | Diflora |
| 2009/0324202 | A1 | 12/2009 | Okubo et al. |
| 2010/0021141 | A1 | 1/2010 | Yamashita et al. |
| 2010/0189416 | A1 | 7/2010 | Kawakami |
| 2010/0208042 | A1 | 8/2010 | Ikeda et al. |
| 2011/0047408 | A1* | 2/2011 | Gille ..................... G06F 11/141 714/723 |
| 2012/0317363 | A1 | 12/2012 | Uola et al. |
| 2013/0188928 | A1 | 7/2013 | Ogawa et al. |
| 2014/0245219 | A1* | 8/2014 | McAllister ............ G06F 3/0485 715/784 |
| 2016/0048307 | A1 | 2/2016 | Troyer et al. |
| 2017/0139824 | A1 | 5/2017 | Dragoljevic et al. |

FOREIGN PATENT DOCUMENTS

| | | |
|---|---|---|
| CN | 101729753 A | 6/2010 |
| CN | 102067591 A | 5/2011 |
| CN | 102207735 A | 10/2011 |
| CN | 102100076 B | 6/2013 |
| CN | 102355590 B | 11/2014 |
| CN | 104657380 A | 5/2015 |
| CN | 104965708 A | 10/2015 |
| CN | 105046640 A | 11/2015 |
| CN | 105550246 A | 5/2016 |
| KR | 20140045285 A | 4/2014 |
| WO | 2006059661 A1 | 6/2006 |
| WO | 2009128232 A1 | 10/2009 |
| WO | 2012160241 A1 | 11/2012 |

OTHER PUBLICATIONS

International Preliminary Report on Patentability Chapter I for PCT Application No. PCT/CN2017/102867 dated Apr. 11, 2019 (12 pages).
John Chen, Android Pictures Cache (Compromise REUSABLEBITMAPDRAWABLE and BITMAPPOOL.), Jan. 25, 2015, http://www.cnblogs.com/John-Chen/p/4246899.html, with English machine translation (10 pages).
First Search for Chinese Application No. 201610877535.6 dated Dec. 23, 2019 (1 page).
Non-final rejection and Search Report for Taiwanese Application No. 106124375 dated Oct. 29, 2019 (5 pages).
Supplementary Search Report for Chinese Application No. 201610877535.6 dated Feb. 27, 2020 (2 pages).
Second Office Action for Chinese Application No. 201610877535.6 dated Mar. 3, 2020 (15 pages).

\* cited by examiner

IMAGE LOADING METHOD AND DEVICE

CROSS-REFERENCE TO RELATED APPLICATIONS

The present application is a continuation application of International Patent Application No. PCT/CN2017/102867, filed on Sep. 22, 2017, which is based on and claims priority to the Chinese Patent Application No. 201610877535.6, filed on Sep. 30, 2016 and entitled "IMAGE LOADING METHOD AND DEVICE." The above-referenced applications are incorporated herein by reference in their entirety.

TECHNICAL FIELD

This application relates to the field of image processing technologies, and in particular, to an image loading method and device.

BACKGROUND

When an Android system loads an image, a large portion of a Java heap memory is occupied to decode the image. However, the size of the Java heap memory for an application process in the Android system is limited. When the usage of the Java heap memory by the application process is relatively high, the Java heap memory easily becomes insufficient, thereby triggering out of memory ("OOM").

To reduce the usage of the Java heap memory, decoded image data can be cached for reuse, thus reducing the needs for decoding images. For example, after a bitmap object is decoded from a network or a local resource, an Least Recently Used (LRU) cache management can be implemented by using LinkedHashMap (i.e., a Map data structure implemented based on link and hash). That is, recently used bitmap objects are saved for reuse by using strong reference (e.g., saved to the LinkedHashMap), thereby achieving reuse of the bitmap objects and improving user application experience. When the quantity of cached data reaches a predetermined value, the cached bitmap objects not frequently used are deleted to release memory for new bitmap objects.

However, when the existing image cache manner is used to achieve the reuse of decoded image data, a bitmap object is still decoded at the layer of a Java framework, and the decoded bitmap object is still cached in the Java heap memory, causing the Java heap memory to easily become insufficient and triggering OOM.

SUMMARY

Embodiments of this application provide an image loading method and device, and a non-transitory computer-readable storage medium to solve the problem that OOM is very easily triggered because pressure of the Java heap memory is still relatively high when decoded image data is reused in an existing image cache manner.

According to one aspect, the embodiments of this application provide an image loading method that may comprise: determining whether a native heap memory stores decoded data of an image to be loaded; in response to determining that the native heap memory stores the decoded data of the image, loading the image based on the decoded data of the image from the native heap memory; and in response to determining that the native heap memory does not store the decoded data of the image, loading the image from a storage space storing the image, and storing, into the native heap memory, decoded data of the image obtained in the process of loading the image.

In some embodiments, the determining whether a native heap memory stores decoded data of the image may comprise: determining whether record data corresponding to the decoded data of the image can be found in cache record information of the native heap memory; and in response to determining that the record data corresponding to the decoded data of the image can be found in the cache record information of the native heap memory, determining that the native heap memory stores the decoded data of the image.

In other embodiments, the method may further comprise: determining whether the decoded data of the image stored in the native heap memory is valid; and in response to determining that the decoded data of the image stored in the native heap memory is valid, obtaining the decoded data of the image from the native heap memory.

In still other embodiments, the determining whether the decoded data of the image stored in the native heap memory is valid may comprise: determining whether a native heap memory pointer that corresponds to the record data of the decoded data of the image in the native heap memory is valid, wherein the native heap memory pointer indicates a storage address of the decoded data in the native heap memory; and in response to determining that the native heap memory pointer is valid, determining that the decoded data of the image stored in the native heap memory is valid.

In yet other embodiments, the cache record information of the native heap memory is stored in a Java heap memory and the record data in the cache record memory of the native heap memory is managed by using an Least Recently Used (LRU) method.

In other embodiments, the decoded data of the image includes pixel array data obtained by decoding the image, and the loading the image based on the decoded data of the image from the native heap memory may comprise: determining whether a bitmap object currently displayed on an image view satisfies a reuse condition for the decoded data of the image; and in response to determining that the bitmap object currently displayed on the image view satisfies the reuse condition, copying the pixel array data from the native heap memory into the bitmap object currently displayed on the image view to obtain a new bitmap object, and rendering the new bitmap object into the image view to load the image.

In still other embodiments, the loading the image based on the decoded data of the image from the native heap memory may comprise: in response to determining that the bitmap object currently displayed on the image view does not satisfy the reuse condition, obtaining, from a bitmap file pool in a Java heap memory, a bitmap object satisfying the reuse condition, copying the pixel array data from the native heap memory into the obtained bitmap object to obtain a new bitmap object, and rendering the new bitmap object into the image view to load the image.

In yet other embodiments, the loading the image based on the decoded data of the image from the native heap memory may comprise: in response to determining that the bitmap object currently displayed on the image view does not satisfy the reuse condition, creating a bitmap object satisfying the reuse condition, copying the pixel array data from the native heap memory into the created bitmap object to obtain a new bitmap object, and rendering the new bitmap object into the image view to load the image.

In other embodiments, the method may further comprise: in response to determining that the bitmap object currently displayed on the image view does not satisfy the reuse condition, storing the bitmap object currently displayed on the image view into a bitmap file pool.

According to another aspect, the embodiments of this application provide an image loading device comprising one or more processors and one or more non-transitory computer-readable memories coupled to the one or more processors and configured with instructions executable by the one or more processors to cause the device to perform operations comprising: determining whether a native heap memory stores decoded data of an image to be loaded; in response to determining that the native heap memory stores the decoded data of the image, loading the image based on the decoded data of the image from the native heap memory; and in response to determining that the native heap memory does not store the decoded data of the image, loading the image from a storage space storing the image, and storing, into the native heap memory, decoded data of the image obtained in the process of loading the image.

According to another aspect, the embodiments of this application provide a non-transitory computer-readable storage medium storing instructions that, when executed by a processor, cause the processor to perform operations comprising: determining whether a native heap memory stores decoded data of an image to be loaded; in response to determining that the native heap memory stores the decoded data of the image, loading the image based on the decoded data of the image from the native heap memory; and in response to determining that the native heap memory does not store the decoded data of the image, loading the image from a storage space storing the image, and storing, into the native heap memory, decoded data of the image obtained in the process of loading the image.

Advantageous effects of the present application are as follows. The embodiments of this application provide an image loading method and device, where decoded image data may be cached in a native heap memory, for reuse during image loading. In this way, because the native heap memory is not counted into a Java heap memory for an application process, pressure of the Java heap memory can be effectively reduced, and probability of triggering OOM is reduced. In addition, image caching can be better implemented by using a heap memory to improve image loading efficiency and reduce system garbage collection (GC).

BRIEF DESCRIPTION OF THE DRAWINGS

To describe the technical solutions in the embodiments of this application more clearly, accompanying drawings are briefly described below. Apparently, the accompanying drawings in the following description show merely some embodiments of this application, and a person of ordinary skill in the art may still derive other drawings from these accompanying drawings without creative efforts.

DETAILED DESCRIPTION OF THE DISCLOSURE

For an Android system, a heap memory may include a Java heap memory and a native heap memory, and the native heap memory is not counted into the Java heap memory. In the embodiments of this application, decoded image data can be cached in the native heap memory for reuse during image loading. In this way, because the native heap memory is not included into the Java heap memory for application processes, pressure of the heap memory for application processes can be effectively reduced, and thus the probability of triggering OOM is reduced. In addition, an image can be cached by using the heap memory, and the decoded data of the image can be reused to improve image loading efficiency, reduce system garbage collection (GC), and further improve system performance.

To make the objectives, technical solutions, and advantages of this application clearer, the following further describes this application in detail with reference to the accompanying drawings. Apparently, the described embodiments are merely a part rather than all of the embodiments of this application. All other embodiments obtained by a person of ordinary skill in the art based on the embodiments of this application without creative efforts shall fall within the protection scope of this application.

Figure 1:
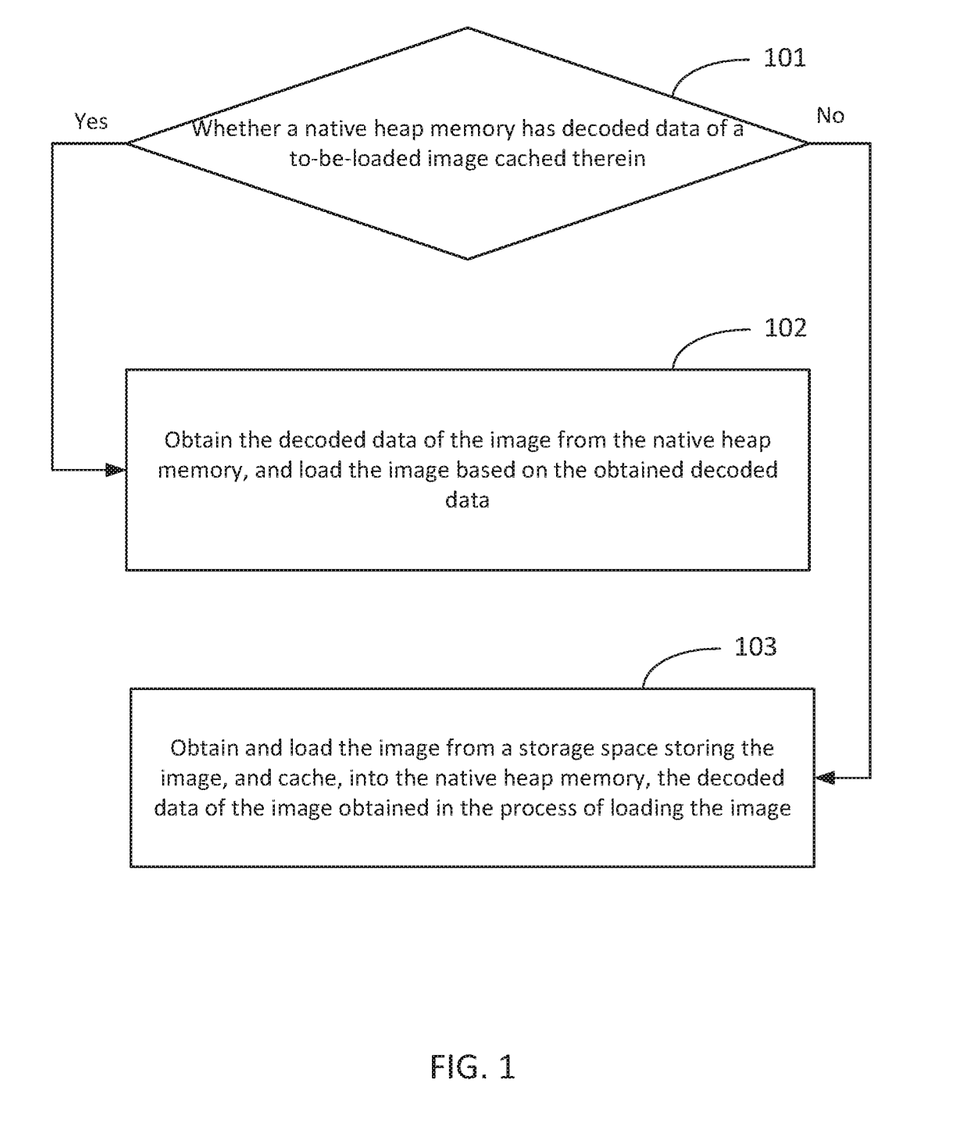
FIG. 1 is a schematic flowchart of an image loading method according to some embodiments of this application.

Embodiments of this application provide an image loading method. The image loading method can be applied to any client or terminal device based on an Android system. As shown in FIG. 1, the image loading method may include the following steps.

Step 101: when loading an image, determining whether native heap memory has decoded data of the image cached therein; and if it is determined that the native heap memory has decoded data of the image cached therein, performing Step 102; and if it is determined that the native heap memory does not have decoded data of the image cached therein, performing Step 103.

In some embodiments, the decoded data of the image may include pixel array data of a bitmap object obtained by decoding the image. For example, the pixel array data may include an array of pixel data. When the decoded data of any image is cached in the native heap memory, corresponding record data may be generated in cache record information of the native heap memory ("NativeCacheInfo"). Therefore, the Step 101 of the method may include: determining whether the record data corresponding to the decoded data of the image can be obtained from the NativeCacheInfo, and if it is determined that the record data corresponding to the decoded data of the image can be obtained from the NativeCacheInfo, determining that the native heap memory has the decoded data of the image cached therein; otherwise, determining that the native heap memory does not have the decoded data of the image cached therein.

Each piece of record data of the NativeCacheInfo may include attribute information such as a width, a height, a native heap memory pointer (also referred to as a "native pointer," used to indicate a storage address of decoded data corresponding to the piece of record data in the native heap memory), Bitmap.Config (used to indicate the amount of memory occupied by each pixel of the image), and a data length of decoded data of an image corresponding to the piece of record data. In addition, to facilitate searching and recording, each piece of record data may be marked with identification information that can uniquely identify the image corresponding to the piece of record data or with identification information that can uniquely identify decoded data of the image corresponding to the piece of record data.

Furthermore, because memory occupied by the NativeCacheInfo is usually relatively small, the NativeCacheInfo may be stored in the Java heap memory. Alternatively, to further reduce storage pressure of the Java heap memory, the NativeCacheInfo may be stored in the native heap memory. In some embodiments, record data in the NativeCacheInfo may be managed by using LRU to maintain, in real time, the record data in the NativeCacheInfo and the image data cached in the heap memory. Further, when a piece of record data is deleted, memory occupied by decoded data corresponding to the piece of record data in the native heap memory may be synchronously released to further reduce the pressure of the heap memory and reduce probability of triggering OOM.

In addition, other manners can be used to determine whether the native heap memory has the decoded data of the image cached therein. For example, data cached in the native heap memory can be scanned, e.g., piece by piece, to determine whether the native heap memory has the decoded data of the image cached therein.

Step 102: obtaining the decoded data of the image from the native heap memory and loading the image based on the obtained decoded data.

Figure 2:
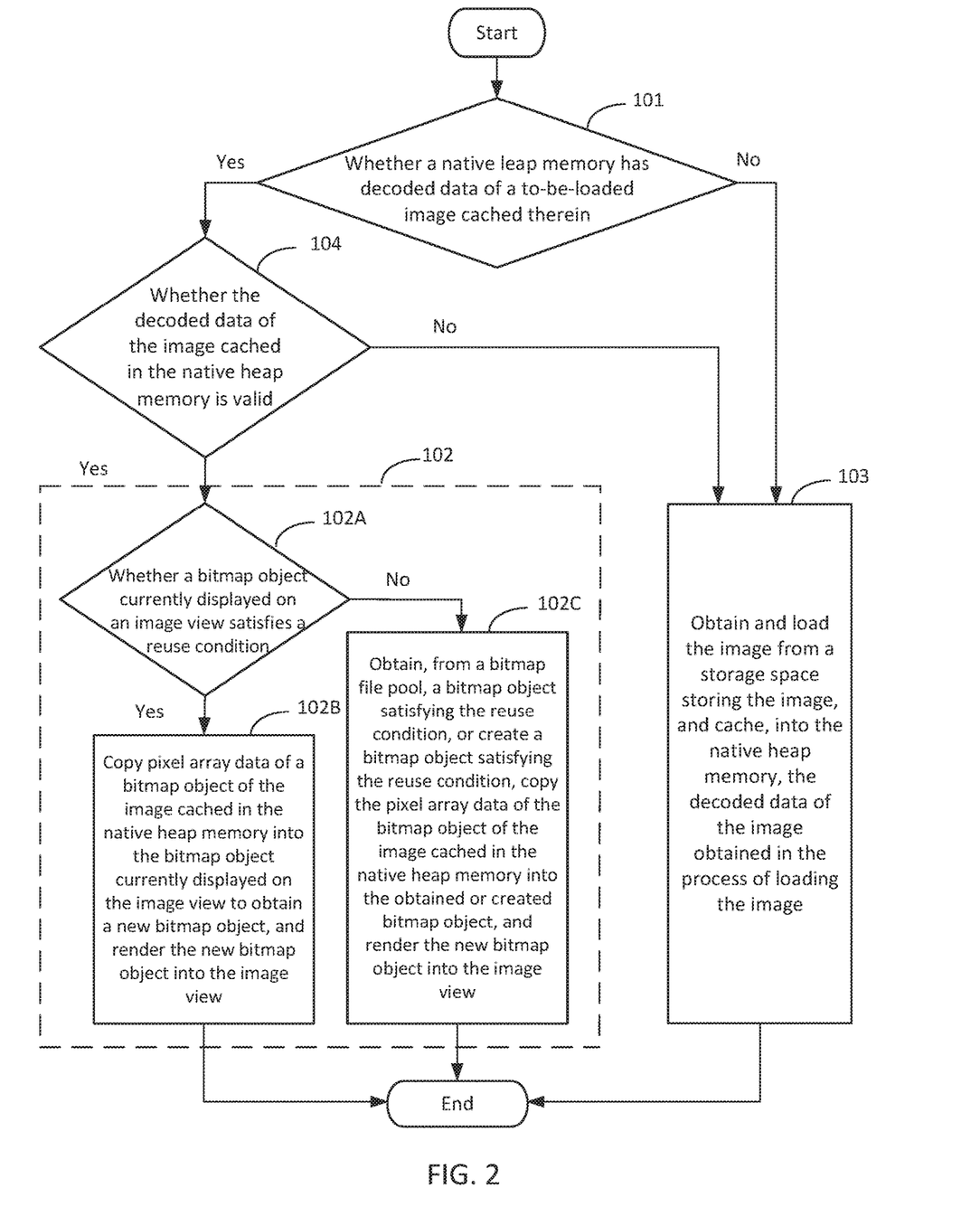
FIG. 2 is another schematic flowchart of an image loading method according to other embodiments of this application.

In some embodiments, as shown in FIG. 2, Step 102 of obtaining the decoded data of the image from the native heap memory and loading the image based on the obtained decoded data may include the following steps.

Step 102A: determining whether a bitmap object currently displayed on an image view satisfies a reuse condition for the decoded data of the image; and if the bitmap object currently displayed on the image view satisfies the reuse condition for the decoded data of the image, performing Step 102B; if the bitmap object currently displayed on the image view does not satisfy the reuse condition for the decoded data of the image, performing Step 102C.

In some embodiments, in a system with a version lower than Android 4.4, when the width, the height, and the Bitmap.Config of an image corresponding to the bitmap object currently displayed on the image view are respectively consistent with the width, the height, and the Bitmap.Config of the image corresponding to the decoded data, and an attribute of the bitmap object the currently displayed on the image view is mutable (that is, modifiable), it may be determined that the bitmap object currently displayed on the image view satisfies the reuse condition for the decoded data of the image, and otherwise, it may be determined that the bitmap object currently displayed on the image view does not satisfy the reuse condition for the decoded data of the image.

In other embodiments, in a system with a version of Android 4.4 or higher, for an image corresponding to the bitmap object currently displayed on the image view, when a product of the width of the image, the height of the image, and the amount of memory occupied by each pixel of the image is not smaller than the data length of the decoded data of the image, it may be determined that the bitmap object currently displayed on the image view satisfies the reuse condition for the decoded data of the image, and otherwise, it may be determined that the bitmap object currently displayed on the image view does not satisfy the reuse condition for the decoded data of the image.

Step 102B: copying pixel array data of a bitmap object cached in the native heap memory and obtained by decoding the image into the bitmap object currently displayed on the image view to obtain a new bitmap object, and rendering the new bitmap object into the image view to load the image.

For example, when the image view has displayed an image A (e.g., a Bitmap-A), if an image B (e.g., a Bitmap-B) is to be displayed, the image B may be bound with the image view, and the pixel array data of the image B may be copied into the image A, to improve image loading efficiency.

In some embodiments, to prevent old data in the image view from interfering with display of new data, before the pixel array data of the bitmap object of the image is copied into the bitmap object currently displayed on the image view, the pixel array data of the bitmap object currently displayed on the image view may be removed first.

Step 102C: obtaining, from a bitmap pool (e.g., a reusable bitmap file pool), a bitmap object satisfying the reuse condition for the decoded data of the image, or creating a bitmap object satisfying the reuse condition for the decoded data of the image, copying the pixel array data of a bitmap object cached in the native heap memory and obtained by decoding the image into the obtained or created bitmap object to obtain a new bitmap object, and rendering the new bitmap object into the image view to load the image.

In some embodiments, as shown in FIG. 2, before step 102C is performed, the bitmap object currently displayed on the image view may be first stored into the reusable bitmap pool for reuse during other image loading processes, to further improve the image loading efficiency and reduce system GC. Although the current bitmap object does not satisfy a reuse condition for a current to-be-loaded image, the current bitmap object may satisfy a reuse condition for other images.

In other embodiments, the reusable bitmap pool may be located in the Java heap memory, and may be referenced through soft reference so that when memory is sufficient, an original resource may be effectively used to reduce GC, and when memory is insufficient, part or all of the memory may be released in time to avoid OOM. In addition, to reduce storage pressure of the heap memory, each bitmap object stored in the reusable bitmap pool may be a bitmap object from which pixel array data has been removed, that is, a bitmap object framework reusable by other images.

Further, in a process of performing Step 102C, it may be determined first whether a bitmap object satisfying the reuse condition for the decoded data of the image can be obtained from the reusable bitmap pool. If the bitmap object satisfying the reuse condition for the decoded data of the image cannot be obtained from the reusable bitmap pool, the operation of creating a bitmap object satisfying the reuse condition for the decoded data of the image is performed, to further improve the image loading efficiency and reduce the system GC.

In some embodiments, a bitmap object satisfying the reuse condition for the decoded data of the image can be created by invoking a system application programming interface (API) and inputting a width, a height, and Bitmap.Config of a to-be-displayed image.

Furthermore, to prevent old data from interfering with display of new data, before the pixel array data of the bitmap object of the image is copied into the obtained bitmap object or the created bitmap object, if it is determined that pixel array in the obtained bitmap object or the created bitmap object is not empty, e.g., the pixel array data has substantial values, the pixel array data in the obtained bitmap object or the created bitmap object may be cleared first.

Further, as shown in FIG. 2, before the decoded data of the image is obtained from the native heap memory, the method may further include the following step:

Step 104: determining whether the decoded data of the image cached in the native heap memory is valid.

When it is determined that the decoded data of the image cached in the native heap memory is valid, the decoded data of the image is then obtained from the native heap memory.

In some embodiments, the determining whether the decoded data of the image cached in the native heap memory is valid may include: determining whether a native pointer in record data in the NativeCacheInfo and corresponding to the decoded data of the image is a valid pointer, and if the native pointer is valid, determining that the decoded data of the image cached in the native heap memory is valid.

In addition, as shown in FIG. 2, if it is determined that the decoded data of the image cached in the native heap memory is invalid, the method may jump to Step 103, that is, the operation of obtaining and loading the image from a storage space storing the image and caching decoded data of the image obtained by the loading of the image into the native heap memory is performed.

In some embodiments, before the decoded data of the image is obtained from the native heap memory, the method may further include the following step. If it is determined that the image corresponding to the bitmap object currently displayed on the image view is loaded for the first time, the pixel array data of the bitmap object currently displayed on the image view may be obtained and cached into the native heap memory for reuse during the next time of display.

In addition, when the pixel array data of the bitmap object currently displayed on the image view is cached into the native heap memory, corresponding record data may be generated in the NativeCacheInfo.

Step 103: obtaining and loading the image from the storage space storing the image, and cache, into the native heap memory, decoded data of the image obtained in the process of loading the image.

In some embodiments, the storage space storing the image may be a local disk cache, a local file, a storage on a network, or the like. In addition, loading the obtained image may include operations such as decoding the obtained image to obtain the bitmap object, and rendering the bitmap object.

In addition, when the decoded data of the image obtained in the process of loading the image is cached into the native heap memory, corresponding record data may be generated in the NativeCacheInfo.

In this application, decoded image data may be cached in the native heap memory for reuse during image loading. In this way, because the native heap memory is not counted into the Java heap memory for application processes, pressure of the Java heap memory can be effectively reduced and thus the probability of triggering OOM is reduced. In addition, an image can be cached by using the heap memory to improve image loading efficiency and reduce system GC.

Figure 3:
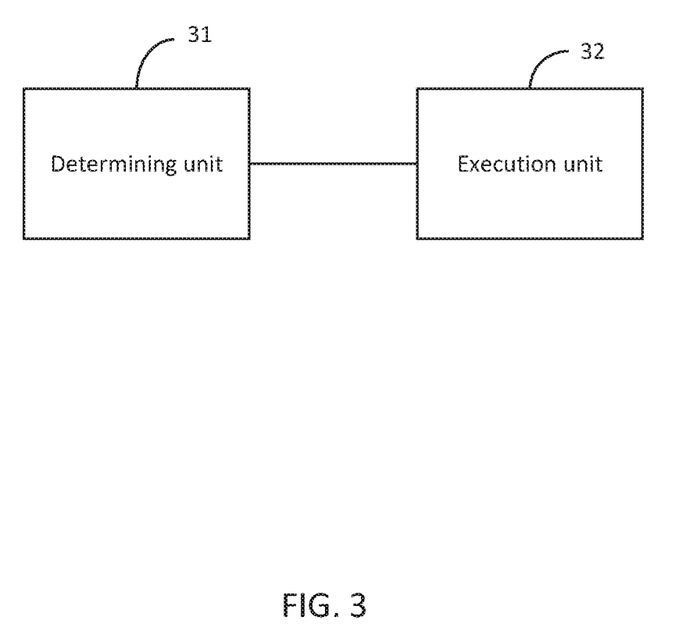
FIG. 3 is a schematic structural diagram of an image loading device according to still other embodiments of this application.

Based on the same inventive concept as that of the image loading method in the above described embodiments, an image loading device is also provided. For details about implementations of the image loading device, reference may be made to related descriptions in the embodiments of the image loading method. In some embodiments, as shown in FIG. 3, the image loading device may include: a determining unit 31 configured to: when loading an image, determine whether native heap memory has decoded data of the image cached therein; and an execution unit 32 configured to: if it is determined that the native heap memory has the decoded data of the image cached therein, obtain the decoded data of the image from the native heap memory, and load the image based on the obtained decoded data; and if it is determined that the native heap memory does not have the decoded data of the image cached therein, obtain and load the image from a storage space storing the image, and cache, into the native heap memory, decoded data of the image obtained in the process of loading the image.

In some embodiments, the determining unit 31 may be further configured to: determine whether record data corresponding to the decoded data of the image can be found in cache record information of the native heap memory, and if the determining result is yes, determine that the native heap memory has the decoded data of the image cached therein.

In some embodiments, the execution unit 32 may be configured to: when it is determined that the decoded data of the image cached in the native heap memory is valid, obtain the decoded data of the image from the native heap memory.

In other embodiments, the execution unit 32 may be configured to: determine whether a native heap memory pointer in the record data that is in the cache record information of native heap memory and corresponds to the decoded data of the image is a valid pointer, and if the determining result is yes, determine that the decoded data of the image cached in the native heap memory is valid, where the native heap memory pointer in each piece of record data in the cache record information of the native heap memory is used to indicate a storage address of decoded data corresponding to the piece of record data in the native heap memory.

In addition, the cache record information of native heap memory may be stored in Java heap memory, and the record data in the cache record information of native heap memory is managed by using an LRU method.

In some embodiments, the decoded data of the image may include pixel array data of a bitmap object obtained by decoding the image. The execution unit 32 may be further configured to: determine whether a bitmap object currently displayed by an image view satisfies a reuse condition for the decoded data of the image; and if the bitmap object currently displayed by the image view satisfies the reuse condition for the decoded data of the image, copy pixel array data of a bitmap object cached in the native heap memory and obtained by decoding the image into the bitmap object currently displayed by the image view to obtain a new bitmap object, and render the new bitmap object into the image view to load the image.

Further, the execution unit 32 may be configured to: if the bitmap object currently displayed by the image view does not satisfy the reuse condition for the decoded data of the image, obtain, from a bitmap file pool, a bitmap object satisfying the reuse condition for the decoded data of the image, or create a bitmap object satisfying the reuse condition for the decoded data of the image, copy pixel array data of a bitmap object cached in the native heap memory and obtained by decoding the image into the obtained or created bitmap object to obtain a new bitmap object, and render the new bitmap object into the image view to load the image, where the bitmap file pool is stored in the Java heap memory, and a reference manner of the bitmap file pool is soft reference.

Furthermore, the execution unit 32 may be configured to: if it is determined that the bitmap object currently displayed by the image view does not satisfy the reuse condition for the decoded data of the image, store the bitmap object currently displayed by the image view into the bitmap file pool.

Persons skilled in the art should understand that, embodiments of this application may be provided as methods, apparatuses (devices), or computer program products. Therefore, this application may take the form of total hardware embodiments, total software embodiments, or embodiments combining software and hardware. In addition, this application may take the form of a computer program product implemented on one or more computer-usable storage media (including, but not limited to, a magnetic storage device, a CD-ROM, and an optical storage device) including computer-usable program code.

This application is described with reference to flowcharts and/or block diagrams of the method, the apparatus (the device), and the computer program product in the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although preferable embodiments of this application have been described, once persons skilled in the art know the basic creative concept, they can make additional changes and modifications to these embodiments. Therefore, the following claims are intended to be construed as to cover the preferable embodiments and all changes and modifications falling within the scope of this application.

Obviously, persons skilled in the art can make various modifications and variations to this application without departing from the spirit and scope of this application. In this case, if the modifications and variations made to this application fall within the scope of the claims of this application and their equivalent technologies, this application is intended to include these modifications and variations.

What is claimed is:

1. An image loading method, comprising:
    determining whether a native heap memory stores decoded data of a first image to be loaded based on cache record information of the native heap memory, wherein the cache record information of the native heap memory is stored in a Java heap memory, wherein the decoded data of the first image includes pixel array data obtained by decoding the first image;
    in response to determining that the native heap memory stores the decoded data of the first image, loading the first image based on the decoded data of the first image from the native heap memory by:
        determining whether a bitmap object currently displayed on an image view and corresponding to a second image satisfies a reuse condition for the decoded data of the first image by comparing a product of a width of the second image, a height of the second image, and a amount of memory occupied by each pixel of the second image to a data length of the decoded data of the first image, and
        in response to determining that the bitmap object currently displayed on the image view satisfies the reuse condition, copying the pixel array data from the native heap memory into the bitmap object currently displayed on the image view to obtain a new bitmap object, and rendering the new bitmap object into the image view to load the first image; and
    in response to determining that the native heap memory does not store the decoded data of the first image, loading the first image from a storage space storing the first image, and storing, into the native heap memory, decoded data of the first image obtained in the process of loading the first image.

2. The method according to claim 1, wherein the determining whether a native heap memory stores decoded data of the first image to be loaded based on cache record information of the native heap memory comprises:
    determining whether record data corresponding to the decoded data of the first image can be found in the cache record information of the native heap memory; and
    in response to determining that the record data corresponding to the decoded data of the first image can be found in the cache record information of the native heap memory, determining that the native heap memory stores the decoded data of the first image.

3. The method according to claim 2, further comprising:
    determining whether the decoded data of the first image stored in the native heap memory is valid; and
    in response to determining that the decoded data of the first image stored in the native heap memory is valid, obtaining the decoded data of the first image from the native heap memory.

4. The method according to claim 3, wherein the determining whether the decoded data of the first image stored in the native heap memory is valid comprises:
    determining whether a native heap memory pointer that corresponds to the record data of the decoded data of the first image in the native heap memory is valid, wherein the native heap memory pointer indicates a storage address of the decoded data in the native heap memory; and
    in response to determining that the native heap memory pointer is valid, determining that the decoded data of the first image stored in the native heap memory is valid.

5. The method according to claim 2, wherein the record data in the cache record information of the native heap memory is managed by using an Least Recently Used (LRU) method.

6. The method according to claim 1, wherein the loading the first image based on the decoded data of the first image from the native heap memory comprises:
    in response to determining that the bitmap object currently displayed on the image view does not satisfy the reuse condition, creating a bitmap object satisfying the reuse condition, copying the pixel array data from the native heap memory into the created bitmap object to obtain a new bitmap object, and rendering the new bitmap object into the image view to load the first image.

7. The method according to claim 1, further comprising:
in response to determining that the bitmap object currently displayed on the image view does not satisfy the reuse condition, storing the bitmap object currently displayed on the image view into a bitmap file pool.

8. An image loading device comprising one or more processors and one or more non-transitory computer-readable memories coupled to the one or more processors and configured with instructions executable by the one or more processors to cause the device to perform operations comprising:
determining whether a native heap memory stores decoded data of a first image to be loaded based on cache record information of the native heap memory, wherein the cache record information of the native heap memory is stored in a Java heap memory, wherein the decoded data of the first image includes pixel array data obtained by decoding the first image;
in response to determining that the native heap memory stores the decoded data of the first image, loading the first image based on the decoded data of the first image from the native heap memory by:
  determining whether a bitmap object currently displayed on an image view and corresponding to a second image satisfies a reuse condition for the decoded data of the first image by comparing a product of a width of the second image, a height of the second image, and a amount of memory occupied by each pixel of the second image to a data length of the decoded data of the first image, and
  in response to determining that the bitmap object currently displayed on the image view satisfies the reuse condition, copying the pixel array data from the native heap memory into the bitmap object currently displayed on the image view to obtain a new bitmap object, and rendering the new bitmap object into the image view to load the first image; and
in response to determining that the native heap memory does not store the decoded data of the first image, loading the first image from a storage space storing the first image, and storing, into the native heap memory, decoded data of the first image obtained in the process of loading the first image.

9. The device according to claim 8, wherein the determining whether a native heap memory stores decoded data of the first image to be loaded based on cache record information of the native heap memory comprises:
determining whether record data corresponding to the decoded data of the first image can be found in the cache record information of the native heap memory; and
in response to determining that the record data corresponding to the decoded data of the first image can be found in the cache record information of the native heap memory, determining that the native heap memory stores the decoded data of the first image.

10. The device according to claim 9, wherein the operations further comprise:
determining whether the decoded data of the first image stored in the native heap memory is valid; and
in response to determining that the decoded data of the first image stored in the native heap memory is valid, obtaining the decoded data of the first image from the native heap memory.

11. The device according to claim 10, wherein the determining whether the decoded data of the first image stored in the native heap memory is valid comprises:
determining whether a native heap memory pointer that corresponds to the record data of the decoded data of the first image in the native heap memory is valid, wherein the native heap memory pointer indicates a storage address of the decoded data in the native heap memory; and
in response to determining that the native heap memory pointer is valid, determining that the decoded data of the first image stored in the native heap memory is valid.

12. The device according to claim 9, wherein the record data in the cache record information of the native heap memory is managed by using an Least Recently Used (LRU) method.

13. The device according to claim 8, wherein the loading the first image based on the decoded data of the first image from the native heap memory comprises:
in response to determining that the bitmap object currently displayed on the image view does not satisfy the reuse condition, obtaining, from a bitmap file pool in a Java heap memory, a bitmap object satisfying the reuse condition, copying the pixel array data from the native heap memory into the obtained bitmap object to obtain a new bitmap object, and rendering the new bitmap object into the image view to load the first image.

14. The device according to claim 8, wherein the loading the first image based on the decoded data of the first image from the native heap memory comprises:
in response to determining that the bitmap object currently displayed on the image view does not satisfy the reuse condition, creating a bitmap object satisfying the reuse condition, copying the pixel array data from the native heap memory into the created bitmap object to obtain a new bitmap object, and rendering the new bitmap object into the image view to load the first image.

15. The device according to claim 8, wherein the operations further comprise:
in response to determining that the bitmap object currently displayed on the image view does not satisfy the reuse condition, storing the bitmap object currently displayed on the image view into a bitmap file pool.

16. A non-transitory computer-readable storage medium storing instructions that, when executed by a processor, cause the processor to perform operations comprising:
determining whether a native heap memory stores decoded data of a first image to be loaded based on cache record information of the native heap memory, wherein the cache record information of the native heap memory is stored in a Java heap memory, wherein the decoded data of the first image includes pixel array data obtained by decoding the first image;
in response to determining that the native heap memory stores the decoded data of the first image, loading the first image based on the decoded data of the first image from the native heap memory by:
  determining whether a bitmap object currently displayed on an image view and corresponding to a second image satisfies a reuse condition for the decoded data of the first image by comparing a product of a width of the second image, a height of the second image, and a amount of memory occupied by each pixel of the second image to a data length of the decoded data of the first image, and in response to determining that the bitmap object currently displayed on the image view satisfies the reuse condition, copying the pixel array data from the native heap memory into the bitmap object currently displayed on the image view to obtain a new bitmap object, and rendering the new bitmap object into the image view to load the first image; and in response to determining that the native heap memory does not store the decoded data of the first image, loading the first image from a storage space storing the first image, and storing, into the native heap memory, decoded data of the first image obtained in the process of loading the first image.

17. The non-transitory computer-readable storage medium according to claim 16, wherein the determining whether a native heap memory stores decoded data of the first image to be loaded based on cache record information of the native heap memory comprises:

determining whether record data corresponding to the decoded data of the first image can be found in the cache record information of the native heap memory; and in response to determining that the record data corresponding to the decoded data of the first image can be found in the cache record information of the native heap memory, determining that the native heap memory stores the decoded data of the first image.

18. The non-transitory computer-readable storage medium according to claim 17, wherein the operations further comprise:

determining whether the decoded data of the first image stored in the native heap memory is valid; and in response to determining that the decoded data of the first image stored in the native heap memory is valid, obtaining the decoded data of the first image from the native heap memory.

19. The non-transitory computer-readable storage medium according to claim 18, wherein the determining whether the decoded data of the first image stored in the native heap memory is valid comprises:

determining whether a native heap memory pointer that corresponds to the record data of the decoded data of the first image in the native heap memory is valid, wherein the native heap memory pointer indicates a storage address of the decoded data in the native heap memory; and in response to determining that the native heap memory pointer is valid, determining that the decoded data of the first image stored in the native heap memory is valid.

20. The non-transitory computer-readable storage medium according to claim 17, wherein the record data in the cache record information of the native heap memory is managed by using an Least Recently Used (LRU) method.

* * * * *

UNITED STATES PATENT AND TRADEMARK OFFICE
CERTIFICATE OF CORRECTION

PATENT NO. : 10,719,909 B2
APPLICATION NO. : 16/364641
DATED : July 21, 2020
INVENTOR(S) : Jinmin Li et al.

Page 1 of 1

It is certified that error appears in the above-identified patent and that said Letters Patent is hereby corrected as shown below:

Assignee item (73):
"ALIBABA GROUP HOLDING LIMITED, Grand Cayman, KY (US)" should read -- ALIBABA GROUP HOLDING LIMITED, Grand Cayman (KY) --.

Signed and Sealed this
Twenty-ninth Day of September, 2020

Andrei Iancu
*Director of the United States Patent and Trademark Office*